Patented Dec. 27, 1938

2,142,039

UNITED STATES PATENT OFFICE 2,142,039

THERMOPLASTIC PRESSURE SENSITIVE COMPOSITION AND SHEET MATERIALS COATED WITH SAME

Allen Abrams and George W. Forcey, Wausau, Wis., assignors to Marathon Paper Mills Company, Rothschild, Wis., a corporation of Wisconsin No Drawing. Application June 28, 1937, Serial No. 150,754

8 Claims. (Cl. 106—23)

This invention relates to pressure sensitive compositions and to sheets coated with such compositions.

One of the objects of this invention is to provide a meltable thermoplastic composition which can be applied directly to any desired base without the use of volatile solvents.

Another object of this invention is to provide a pressure sensitive composition suitable for use on masking tape, tabs, posters and other similar articles and adhesive units which can be attached to any desired object or surface by merely pressing them onto such surface and from which they can be readily removed without fouling or marring same.

Another object of the invention is to provide a method of applying the meltable pressure sensitive composition to any desired base materials.

Further objects and details will appear from the following description of the invention as defined in the appended claims.

Our adhesive composition may be compounded so as to adhere by mere pressure to any desired dry and clean supporting surface such as metal, glass, wood, lacquered or painted surfaces, films of any type, fibrous surfaces such as paper, cloth and leather and the like. When our adhesive composition is coated on a suitable backing it is possible to remove such backing from any surface to which it may be attached without leaving any adhesive on the surface or fouling same.

After much experimentation we have discovered that the essential ingredients of our type of composition hereinafter referred to as a "thermoplastic pressure sensitive composition" consist of a cohesive agent, an adhesive agent, a common non-volatile solvent or plasticizer for these agents, and a modifier for producing the desired final characteristics of the composition as hereinafter described.

The function of the cohesive agent in our thermoplastic pressure sensitive composition is to give sufficient body to the composition so that when it is spread in a layer on a suitable base such as paper, the mass of the composition will cohere to itself sufficiently so as to remain integral and the adhesive layer will not tear, separate or shred when peeled from the supporting surface to which it may be attached by pressure.

The cohesive agent thus imparts to our composition that property which binds the adhesive film together and prevents it from separating and fouling the surface to which it has been attached. The cohesive agent should be reasonably stable and should be soluble in the adhesive, modifier and plasticizing agents. We have found the following substances, for example, advantageous for this purpose:

Isobutylene polymer, made for example according to Patent No. 2,051,840 and available on the market under the trade-name "Vistanex".
Ethyl cellulose.
Natural rubber, including india rubber, smoked sheet, pale crepe rubber, balata and caoutchouc.
Synthetic rubbers, including polymers of isoprene, butadiene and their homologues.
Rubber derivatives, including chlorinated rubbers.

The function of the adhesive agent is to impart sufficient adhesiveness to our composition so that it will adhere to any desired surface by the application of pressure, but can be completely peeled or readily removed from the surface to which it is attached without fouling it or leaving behind any particles of adhesive. The adhesive agent imparts the property of tack or adhesion to our composition. The material should be thermoplastic, capable of dissolving the cohesive agent, compatible with the plasticizer and modifier, and impart the necessary tack to the mixture. It should also not affect adversely the stability of the cohesive agent. We have found that the following substances, for example, can be advantageously used:

Ester gum
Hydrogenated rosin
Hard type cumars
Unmodified phenol-formaldehyde resins
Alkyd type resins
Toluene sulphonamide resins
Pitch
Rosin The plasticizer acts on the adhesive agent and helps to control the tack or adhesion of our composition. It must dissolve both the cohesive and adhesive agents, be compatible with the viscosity modifier, must be non-drying and is usually an oily or soft resinous substance. It should not adversely affect the stability of the adhesive or cohesive agent. We have found the following substances, for example, can be used advantageously:

Methyl abietate ($C_{19}H_{29}COOCH_3$)
    Dihydro methyl abietate ($C_{19}H_{31}COOCH_3$)
    Soft type alkyd resins
    Soft type cumar resins
    Dibutyl phthalate
    Diethyl phthalate
    Mineral oil
    Chlorinated naphthalene
    Tricresyl phosphate
    Triphenyl phosphate
    Chlorinated diphenyl
    Chlorinated resins, such as "Aroclors"

We prefer to use a non-volatile plasticizer as it enables us to prepare our thermoplastic pressure sensitive compositions which can be readily applied to any desired backing in a superficially adherent layer or coating without requiring elaborate or expensive equipment as would be necessary if volatile solvents were employed. The use of volatile solvents is objectionable as they may cause excessive penetration of the base sheet materials. Furthermore the use of non-volatile solvents is more economical as they remain in the final composition and perform a useful function whereas in the case of volatile solvents they escape or are lost by evaporation after the composition is spread on the backing. The great fire hazard when volatile solvents are employed is also obviated.

The modifier controls the viscosity of our composition and makes it possible to coat the composition by the hot-melt method. The material must be thermoplastic, a solvent for the adhesive and cohesive agents, must be compatible with the plasticizer. It must not detract from the tack of the composition nor have any adverse effect on the stability of the other materials. We have found the following substances, for example, can be used advantageously:

Amorphous micro crystalline waxes
    Hydrogenated waxes such as "I. G. wax"
    Hydrogenated cotton seed oil
    Waxes or wax-like substances including
    Natural and animal waxes such as: beeswax, spermaceti, and stearic acid
    Vegetable waxes such as: Japan wax, carnauba, and candelilla wax.
    Mineral waxes such as: Montan wax, paraffin wax, either crystalline or amorphous.

By varying the proportions and the ingredients used it is possible to produce a pressure sensitive thermoplastic composition having the desired adhesive and cohesive properties of the character previously described. The composition should be so compounded that upon heating to a suitable temperature it attains a sufficiently low viscosity so that it can be readily spread on a backing sheet, such as paper, by a heated doctor roll or bar so as to give a smooth and even coating and at the same time sufficiently permeate the sheet to bind to the surface fibers of the backing so as to firmly adhere the coating to same.

In carrying out one form of our invention, a thermoplastic pressure sensitive composition in its simplest form may be prepared utilizing the following formula, the proportions being approximately as stated:

Example 1

| | Percent by weight |
|---|---|
| Rubber | 30 |
| Ester gum | 23 |
| Methyl abietate | 23 |
| Amorphous wax (M. P. 155° F.) | 24 |

In this composition the rubber acts as the cohesive agent, the ester gum acts as the adhesive agent, the methyl abietate acts as the plasticizer, and the wax as the modifier.

In preparing this composition the ester gum, methyl abietate and wax are preferably melted in a mixer, such as a Werner-Pfleiderer mixer, and heated to a temperature of approximately 210° F. The rubber is then added and the temperature permitted to drop to about 180° F. and the mix stirred at this temperature for about 1½ hrs. until it is smooth and homogeneous. At the end of this time the hot composition can be coated on any suitable base.

The composition is preferably heated to about 180–200° F. and is applied to the base sheet such as paper, for example, by means of a doctor roll or doctor blade heated to about 180–200° F. so as to spread a thin layer of the composition of the desired thickness on the base sheet. The base sheet, such as paper, is preferably supported on a heated rubber covered roll coating with the spreader roll and spaced away sufficiently to permit the proper thickness of the composition to be applied. After the adhesive coating is spread, the coating is permitted to congeal preferably by passing the web over a chilled roll, and cover strip is applied lightly thereto sufficiently to contact the coating. The cover strip is made of web material that the composition will tend to adhere to the base sheet with greater tenacity than it will adhere to the cover strip, thereby permitting ready peeling of the cover strip. When paper is used as the base sheet a cover strip of glassine or holland cloth is found satisfactory.

Many other formulas may be used depending upon the character of the final composition desired, the base upon which it is applied, and the purpose for which it is to be utilized. The proportions of the ingredients can be varied over a wide range and the essential agents combined either singly, in combination, or compatible mixtures with others of similar characteristics.

In general our pressure sensitive thermoplastic composition may contain the ingredients previously mentioned varying in about the following range of proportions:

| | Percent by weight |
|---|---|
| Cohesive agent | 15–60 |
| Adhesive agent | 10–50 |
| Plasticizer | 5–45 |
| Modifier | 4–45 |

The proportions of the ingredients of our pressure sensitive thermoplastic composition are adjusted for any specific combination of substances so as to have the proper viscosity in order to be spreadable upon a backing sheet such as paper and the like by a heated element to form a uniform thin surface film. The cohesiveness of the composition should be greater than the adhesiveness so that when a coated sheet is pressed on any suitable surface such as wood, glass or metal it can be peeled off without tearing apart the coating of adhesive on the sheet. The composition should also be permanently tacky and be capable of adhering to a supporting surface by applying pressure with the fingers. It should also be peelable from the supporting surface without fouling, marking or marring it.

Example 2

|  | Percent by weight |
|---|---|
| Rubber | 30 |
| Cumar resin 40° (paracoumarone-resin) | 24 |
| Cumar resin 10° | 28 |
| Amorphous wax (M. P. 155° F.) | 15 |
| White mineral oil | 2 |
| Hydroquinone | 1 |

This composition is very viscous. The amorphous wax acts as a modifier. The cumar resins act as the adhesive agent. The mineral oil acts as the plasticizer. The rubber acts as the cohesive agent. The hydroquinone is an antioxidant for the rubber.

Example 3

|  | Percent by weight |
|---|---|
| Rubber | 15 |
| Vistanex (isobutylene polymer) | 15 |
| Amorphous wax (M. P. 155° F.) | 19 |
| Methyl abietate | 25 |
| Ester gum | 25 |
| Hydroquinone | 1 |

This composition is suitable for applying to a paper base for use as removable adhesive units, tabs or tape. In this composition part of the rubber has been substituted by Vistanex. Glycerine or other hygroscopic substances may be added to the composition to facilitate clean peeling or removal of the adhesive from a glass supporting surface to which it may be attached after exposure to light. The hydroquinone serves as a preservative for the rubber and reduces the deterioration and breakdown caused by light and air. Any other suitable known antioxidants may be added in suitable proportions to our compositions to prevent the deterioration of the rubber content or any other ingredient of our composition likely to deteriorate on exposure to light or air.

If desired, any suitable pigment may be added to our composition to impart to it any required color. Also any suitable deodorant may be added. Methyl salicylate, for example, is suitable for compositions containing rubber.

This composition may be applied to any suitable sheet materials such as leather, textiles, paper, cardboard, Bristol-board, sheet materials made of resins, viscose, cellulose acetate, hydrated cellulose and any other type of films.

When such compositions are used for making removable adhesive units the adhesive composition used for any desired base is prepared so as to have the proper adhesive and cohesive characteristics as previously explained to permit removal of the adhesive units from any surface to which they are intended to be attached without fouling the supporting surface and without leaving behind particles of the adhesive or pieces of the attached unit.

Example 4

|  | Percent by weight |
|---|---|
| Pale crepe rubber | 50.0 |
| Ester gum | 18.5 |
| Methyl abietate | 17.5 |
| Amorphous microcrystalline wax | 13.5 |
| Hydroquinone | 0.5 |

In this composition the pale crepe rubber acts as the cohesive agent, the ester gum as the adhesive agent or tack producer, the amorphous wax as the modifier, and the methyl abietate as the plasticizer. The hydroquinone is a preservative.

Example 5

|  | Percent by weight |
|---|---|
| Pale crepe rubber | 10.0 |
| Vistanex (isobutylene polymer) | 5.0 |
| Ester gum | 32.0 |
| Methyl abietate | 30.0 |
| Amorphous wax | 22.0 |
| Hydroquinone | 0.5 |
| Glycerine | 0.5 |

Example 6

|  | Percent by weight |
|---|---|
| Pale crepe rubber | 30.0 |
| Ester gum | 50.0 |
| Dihydro methyl abietate | 10.5 |
| Beeswax | 9.0 |
| Hydroquinone | 0.5 |

Example 7

|  | Percent by weight |
|---|---|
| Pale crepe rubber | 25.0 |
| Vistanex (isobutylene polymer) | 10.0 |
| Ester gum | 10.0 |
| Methyl abietate | 10.0 |
| Amorphous wax | 44.5 |
| Hydroquinone | 0.5 |

Example 8

|  | Percent by weight |
|---|---|
| Pale crepe rubber | 21.0 |
| Vistanex (isobutylene polymer) | 8.5 |
| Ester gum | 20.5 |
| Methyl abietate | 45.0 |
| Amorphous wax | 4.0 |
| Hydroquinone | 0.5 |
| Glycerine | 0.5 |

Example 9

|  | Percent by weight |
|---|---|
| Ethyl cellulose | 8.0 |
| Dihydro methyl abietate | 40.0 |
| Ester gum | 47.0 |
| Amorphous wax | 5.0 |

Examples 5 to 9 given above illustrate various thermoplastic pressure sensitive compositions which may be made in accordance with our invention.

The specific compositions described in this specification are given as exemplificatory embodiments of the invention and it is intended to include in the appended claims not only such specific compositions and their range of proportions, but also any equivalents and variations within the scope of the disclosure.

This application is a continuation-in-part of application Serial No. 98,978, filed Sept. 1, 1936.

We claim:

1. A normally removable and reusable adhesive sheet material comprising a base sheet having a normally tacky and normally pressure sensitive coating composition comprising 15 to 60% by weight cohesive agent, 10 to 50% by weight adhesive agent, 5 to 45% by weight of a non-volatile plasticizer, and 4 to 45% modifier.

2. A normally removable and reusable adhesive sheet material comprising a base sheet having a normally tacky and normally pressure sensitive coating composition comprising 15 to 60% by weight of rubber, 10 to 50% by weight of ester gum, 5 to 45% by weight of methyl abietate, 4 to 45% of amorphous wax.

3. A normally removable and reusable adhesive sheet material comprising a base sheet having a normally tacky and normally pressure sensitive coating composition comprising a cohesive agent, an adhesive agent, a non-volatile plasticizer, and a modifier in substantially equal amounts by weight.

4. A normally removable and reusable adhesive sheet material comprising a base sheet having a normally tacky and normally pressure sensitive coating composition consisting of rubber 15%, isobutylene polymer 15%, amorphous wax 20%, methyl abietate 25% and ester gum 25%.

5. In a pressure sensitive adhesive paper, an adhesive coating which is normally tacky or sticky consisting of rubber 15%, isobutylene polymer 15%, amorphous wax 20%, methyl abietate 25% and ester gum 25%.

6. A normally removable and reusable adhesive sheet material comprising a base sheet having a normally tacky and normally pressure sensitive coating composition comprising 15 to 60% by weight of a cohesive agent, 10 to 15% by weight of an adhesive agent, 5 to 45% by weight of a non-volatile plasticizer, 4 to 45% of a modifier and a small proportion of a suitable anti-oxidant for the cohesive agent.

7. A normally removable and reusable adhesive sheet material comprising a paper sheet having a normally tacky and normally pressure sensitive coating composition consisting of rubber 15%, isobutylene polymer 15%, amorphous wax 20%, methyl abietate 25%, and ester gum 25%.

8. In a pressure sensitive adhesive paper, an adhesive coating which is normally tacky or sticky, comprising a cohesive agent 15 to 60% by weight, an adhesive agent 10 to 50% by weight, 5 to 45% by weight of a non-volatile plasticizer for said agents and 4 to 45% by weight of a modifier.

ALLEN ABRAMS.
GEORGE W. FORCEY.